Feb. 2, 1932.    P. S. JACKSON    1,843,365
WORK FEED FOR MACHINE TOOLS
Filed Oct. 12, 1928    3 Sheets-Sheet 1

Inventor:
Paul S. Jackson,
By Chindahl Parker Carlson
Attys.

Feb. 2, 1932.     P. S. JACKSON     1,843,365
WORK FEED FOR MACHINE TOOLS
Filed Oct. 12, 1928    3 Sheets-Sheet 2
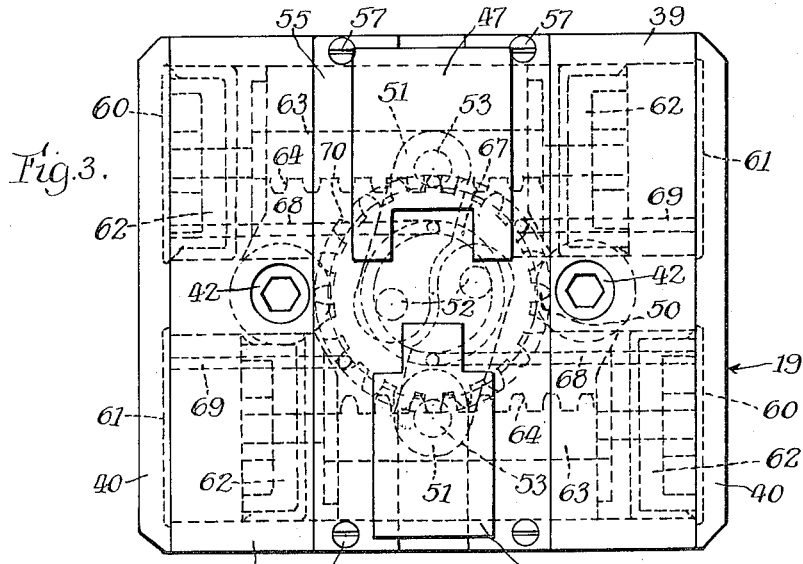
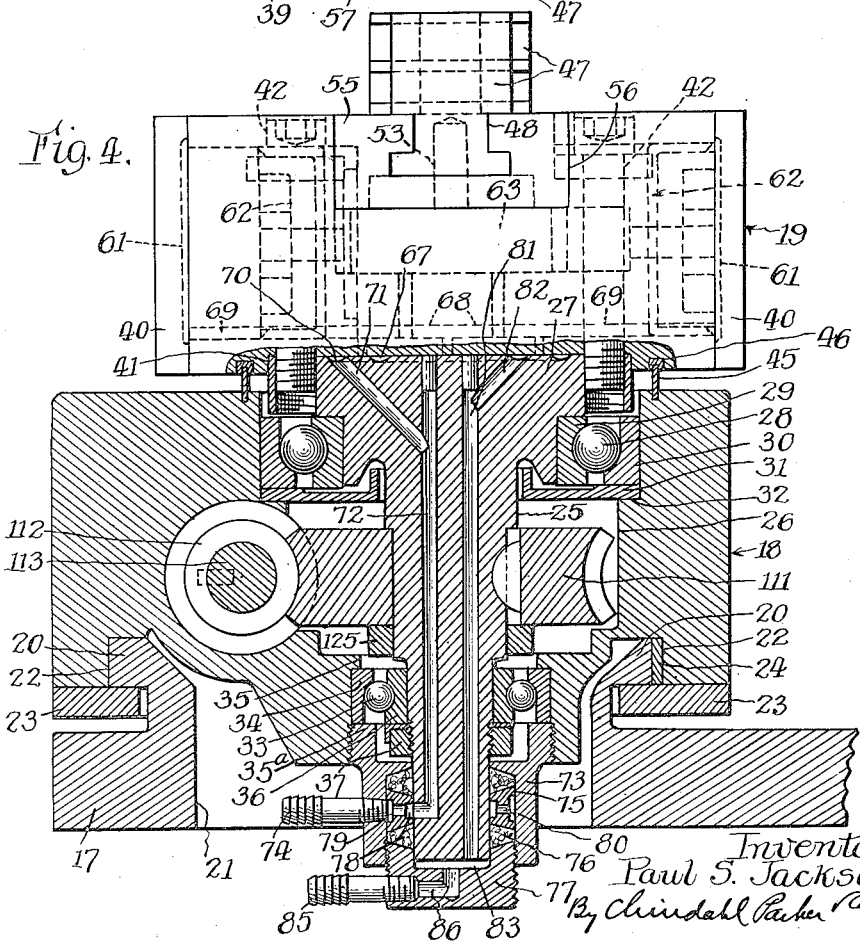

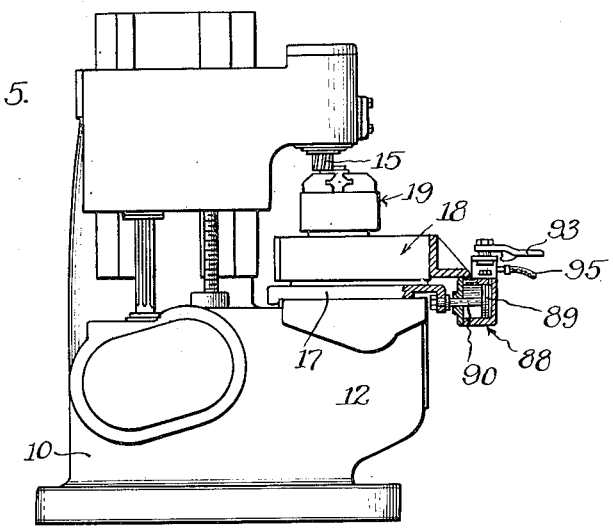
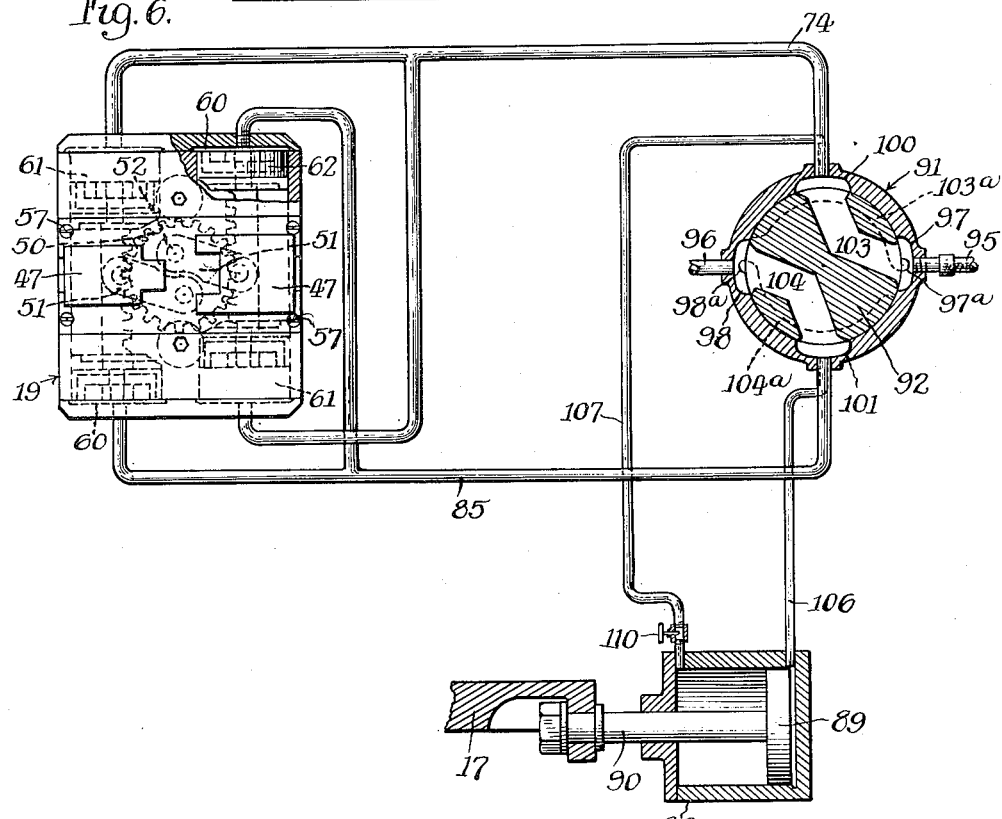

Patented Feb. 2, 1932

1,843,365

UNITED STATES PATENT OFFICE

PAUL S. JACKSON, OF ROCKFORD, ILLINOIS, ASSIGNOR TO SUNSTRAND MACHINE TOOL CO., OF ROCKFORD, ILLINOIS, A CORPORATION OF ILLINOIS

WORK FEED FOR MACHINE TOOLS

Application filed October 12, 1928. Serial No. 311,999.

The invention relates generally to machine tools and more particularly to a novel work holder and feeding means therefor adapted for machine tools.

The primary object of the invention is to provide a new and improved work holder and feeding means for machine tools operable economically and rapidly to produce accurately dimensioned duplicate parts without undue physical effort upon the part of the operator.

Another object is to provide a work holder having a feeding mechanism and an auxiliary means operable independently of the feeding mechanism to accomplish a rapid approach and return of the work holder relatively to the cutter.

Another object of the invention is to provide such a work holder embodying new and improved power operated means for clamping work pieces thereon and for moving the work holder to its operative position adjacent the cutter, said means being operable to accomplish both of these results practically simultaneously whereby to effect a saving in operating time.

Another object is to provide a work holder movably mounted on a slidable saddle, mechanical means for imparting a feeding movement to the work holder relatively to the saddle, power operated means for clamping work pieces on the holder, and means for moving the saddle rapidly between operative and inoperative positions, together with control means for said several means located on the forward side of the saddle within easy reach of an operator.

In pursuance of the foregoing objects I aim to provide a machine embodying a saddle having a movable work holder thereon, mechanical means adapted to be driven from the prime mover of the machine for imparting a feeding movement to the work holder relatively to the saddle, pressure fluid operated means on the work holder for clamping a work piece thereon and pressure fluid operated means for moving said saddle between an inoperative or loading position remote from a tool wherein the operator may quickly and easily place a work piece in the work holder and an operative position adjacent the tool wherein an operation is performed on the work piece by the tool, and for maintaining it in the position to which it is moved, together with control means for said several means conveniently positioned on the forward side of the saddle.

Other objects and advantages will become apparent from the following description taken in connection with the accompanying drawings, in which:

Fig. 3 is a plan view of the work holder.

Fig. 4 is an enlarged front elevational view of the work holder taken partially in section along the line 4—4 of Fig. 2.

Fig. 5 is a side elevational view of the invention as embodied in a milling machine having a vertical milling cutter.

Fig. 6 is a plan view partially in section of the work holder showing diagrammatically the pressure fluid connections and control means therefor.

Figure 1:
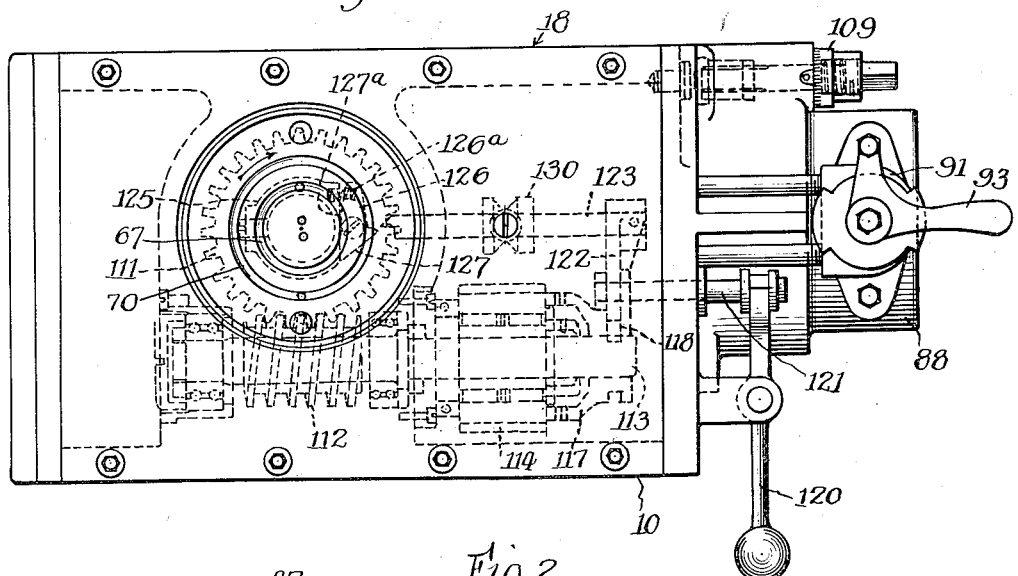
Figure 1 is a plan view of a part of a work holding and feeding means embodying the preferred form of the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the form chosen for disclosure, all of the constituent elements of the invention are compactly arranged so as to be economical of space. Thus a work holder or chuck 19 (Fig. 2) is provided, rotatably mounted on a saddle 18 which is in turn mounted for longitudinal sliding movement on a sub-base 17. It is contemplated that the sub-base 17 will be secured to the base of the machine on which the invention is embodied. Thus, for example, as illustrated in Fig. 5, the sub-base is mounted on the knee portion 12 of the base 10 of a vertical milling machine having a rotatable cutter 15 so that by movement of the saddle 18 on the sub-base 17, the work holder 19 may be placed in an inoperative or loading position remote from the cutter 15 in which position the operator may readily place a work piece accurately in position on the work holder 19, or in an operative position adjacent the cutter 15 in which position the rotation of the work holder will cause a peripheral cut of material to be taken from a work piece.

As shown in detail in Fig. 4, the slidable saddle 18 comprises a hollow casting supported and guided for rectilinear movement on upstanding ways 20 (Fig. 4) formed on the sub-base 17 on opposite sides of an aperture 21 therein. These ways 20 extend from front to rear of the machine and suitable complementary guides 22 are formed in the saddle 18 to slide on the ways 20. To maintain the saddle 18 in position on the ways retaining plates 23 are provided on the saddle which extend beneath the sides of the ways 20 and engage the bottom surface thereof. In order that the saddle 18 may be properly adjusted on the ways 20 so as to insure movement along a definite path, a taper gib 24 is provided between one side of one of the ways 20 and the side of its guide 22.

The work holder 19 is preferably mounted for rotation relatively to the saddle 18 by means of a spindle 25 (Figs. 2 and 4) mounted in a vertically extending aperture 26 in the saddle 18 and for rotation about a vertical axis. As illustrated herein, this spindle 25 has an outwardly extending annular flange 27 formed at its upper end beneath which a ball bearing 28 is positioned. The bearing 28 is of the wedge type having an inner race 29 abutting the lower end of the flange 27 and an outer race 30 supported by an annulus 31 resting on a shoulder 32 formed in the saddle 18. Thus the bearing 28 will take downward thrust impressed on the spindle 25 and a second ball bearing 33 is provided for the spindle 25 mounted thereon adjacent its lower end and arranged to take any upward thrust impressed on the spindle. In the present instance the lower bearing 33 is of the same type as the upper bearing 28 and has an outer race 34 held in fixed position relatively to the saddle 18 between an annular flange 35 formed on the saddle and abutting the upper side of the race 34 and a nut 35ª screw threaded into the lower end of the saddle 18 and abutting the lower side of the race 34.

The lower bearing 33 has an inner race 36 slidably mounted on the spindle 25 and a nut 37 fitted on the spindle so that the inner race 36 may be adjusted upwardly of the spindle to maintain the upper and lower bearings continually in their proper positions.

The chuck or work holder 19 in the form shown comprises a box-shaped hollow casting having walls 39 and 40 and having a circular recess 41 formed in its lower side arranged to fit about the annular flange 27 to position the work holder 19 definitely and accurately on the spindle. The work holder is preferably maintained in position on the spindle by a plurality of socket-headed bolts 42 extending downwardly through the work holder 19 and engaging threaded bores in the flange 27.

To prevent chips and débris from reaching the bearings 28 and 33 an annular guard 45 (Fig. 4) is preferably positioned concentrically of the spindle 25 about the top of the aperture 26 in the saddle so as to project upwardly about the aperture 26 to engage suitable packing 46 secured on the work holder.

For the purpose of securing a work piece in position on the work holder, clamping means is provided mounted in the present instance on the upper side of the work holder. This means preferably comprises a pair of chuck jaws 47 held in position on the work holder 19 and guided for sliding movement toward and from each other by engagement with a transversely positioned inverted T-slot 48 (Fig. 4) formed in the upper side of the work holder 19. The chuck jaws 47 are formed at their inner ends so as to engage properly the particular piece of work which is to be done and to center the work accurately on the work holder.

In order that the jaws 47 will invariably clamp a work piece in proper position on the work holder, means is provided to move the two jaws 47 back and forth in timed relation to each other. This means in the preferred form illustrated comprises a rotatable member in the form of a pinion 50 (Figs. 3 and 6) rotatably mounted in a horizontal plane within the work holder 19 and beneath the chuck jaws 47 and operatively connected to both of the jaws by links 51 so that the jaws may be operated by rotative movement of the pinion 50. As shown herein the links 51 are positioned above the pinion 50 and are each connected at one end to the pinion 50 at diametrically opposite points by means of vertical pins 52. The other end of each link 51 is pivotally connected to one of the jaws 47 by a pivot pin 53 projecting upwardly therefrom through the open bottom side of the T-slot 48 and engaging a suitable bore in the jaw 47.

To permit ready removal of the jaws 47 for inspection, replacement or repair, the T-slot 48 in which the jaws 47 are mounted preferably is formed in a removable section 55 (Figs. 3 and 4) positioned in a groove 56 formed in the work holder 19 and the section 55 is secured in place by screws 57 passing therethrough and engaging the side walls 39 of the work holder. Thus the section 55 may be removed vertically from the work holder and the jaws 47 will become disengaged from the pins 53. The jaws 47 may then be removed from the T-slot 48 for replacement or repair and the jaw operating mechanism within the holder 19 will be partially exposed for inspection.

To reduce to a minimum the time and effort required to produce a finished work piece, power operated means is preferably provided for operating the chuck jaws 47 and for moving the saddle 18 between its two positions. The power means employed is preferably such that the chuck jaws 47 and the saddle 18 may, if desired, be moved practically simultaneously.

This power means as illustrated herein is pressure fluid operated and for the chuck jaws 47 (as shown in Figs. 2, 3, 4 and 6) the means comprises a plurality of cylinder and piston devices mounted within the work holder 19 and arranged to oscillate the pinion 50 to clamp or unclamp the jaws. These cylinder and piston devices are of the single acting type and in order that they may be sufficiently small to be mounted within the work holder 19, two cylinders 60 and pistons 62 are provided for opening the chuck jaws 47 while two cylinders 61 and pistons 62 are provided for clamping them. Thus the two cylinders 60 are mounted in diagonally opposite corners of the holder 19 while the cylinders 61 are mounted in the other two corners so as to form two pairs of oppositely acting cylinders, each pair comprising one cylinder 60 and one cylinder 61.

Figure 2:
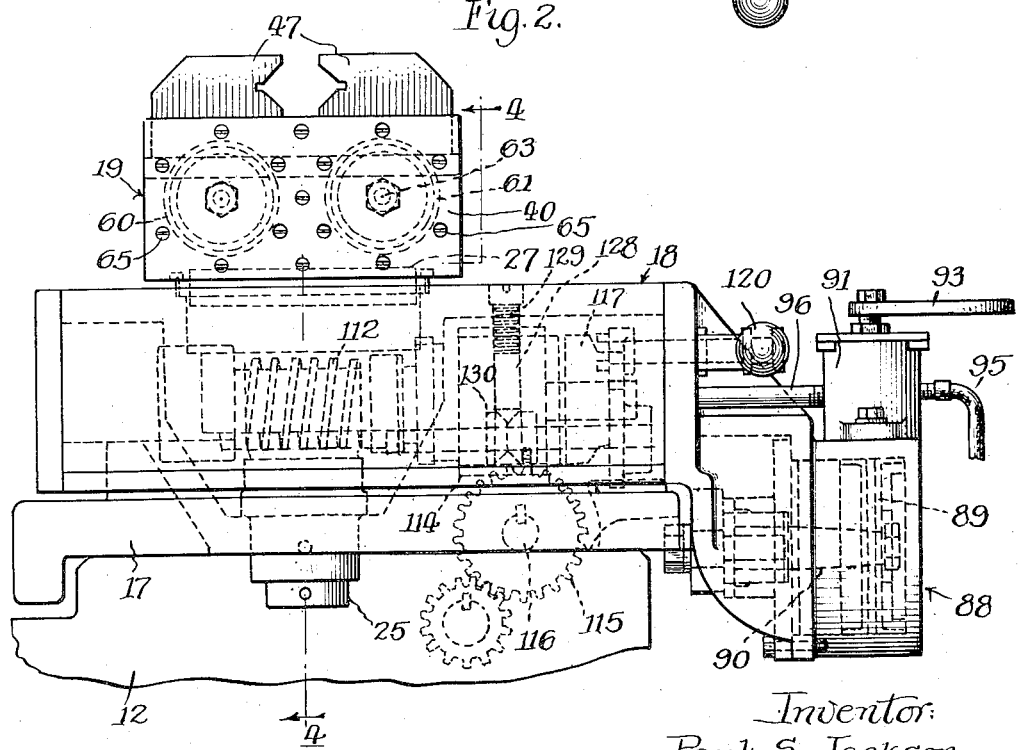
Fig. 2 is a side elevational view of the mechanism shown in Fig. 1 with the work holder in place thereon.

The cylinders 60 and 61 in each pair are axially alined and the pistons 62 therein are connected by a piston rod 63 in each pair attached to both of the pistons in the pair. Thus the two piston rods 63 are disposed in substantially parallel relation and rack teeth 64 (Fig. 3) are formed thereon to engage and rotate the pinion 50 when the piston rods 63 are moved. By supplying pressure fluid to the two cylinders 61 the chuck jaws may be clamped while pressure fluid in the two cylinders 60 will cause the jaws to be unclamped. In order that the cylinders 60 and 61 may be easily accessible, the two side walls 40 (Figs. 2, 3 and 4) of the work holder 19 are removably secured on the holder by screws 65 (Fig. 2).

As shown in Figs. 3 and 4, the two cylinders 60 which serve to open the jaws 47 are connected to a common pressure fluid port formed by an annular groove 67 cut in the upper surface of the flanged head 27 of the spindle 25. The groove 67 is closed by the work holder 19 which rests and is clamped directly on the head 27. The two cylinders 60 are connected to the port 67 by means of two bores 68 formed in the body of the work holder 19.

The other two cylinders 61 which serve to close the jaws 47 are connected by bores 69 in the work holder 19 to a similar port formed by an annular groove 70 of greater diameter than the groove 67 formed in the head 27 of the spindle.

As shown in Fig. 4, the port 70 is connected by means of a bore 71 with the upper end of a longitudinal bore 72 formed in the spindle 25 which bore extends to a point near the bottom end of the spindle 25 and then opens outwardly radially of the spindle. At this point the spindle 25 is surrounded by an annular sleeve 73 depending from the nut 35$^a$ radially spaced in relation to the spindle 25 to provide for a gland connection of a flexible air supply tube 74 with the bore 72. In the form shown, an annular spacer or collar 75 is placed within the sleeve 73 in register with the end of the bore 72 and the spacer 75 is held in place with suitable packing 76 above and below it by means of a nut 77 screw-threaded into the bottom of the sleeve 73. The spacer 75 has annular grooves 78 and 79 formed on its inner and outer sides respectively arranged to register at all times with the tube 74 and the bore 72 and these grooves 78 and 79 are connected by a plurality of radial bores 80 in the spacer 75.

Thus pressure fluid may be supplied to the cylinders 61 to close the jaws 47 in any rotative position of the work holder 19. This result is attained also in the case of the cylinders 60 by means of a longitudinal bore 81 formed in the spindle 25 and connected to the chamber 67 by a bore 82, said longitudinal bore extending through the bottom of the spindle 25 into a chamber 83 formed in the packing nut 77. Pressure fluid is supplied to this chamber by a flexible tube 85 screw threaded into a bore 86 formed in the nut 77 and opening into the chamber 83.

The power means for moving the saddle 18 back and forth on the ways 20 between its operative and inoperative position comprises, in the preferred form illustrated, a double acting pressure fluid operated cylinder 88 (Figs. 1, 2, 5 and 6) mounted on and depending from the forward side of the saddle 18 and a piston 89 therein stationarily connected to the sub-base 17 by means of a piston rod 90. Thus by supplying pressure fluid selectively to the cylinder 88 on opposite sides of the piston 89, the saddle 18 may be moved back and forth on the ways 20.

Preferably a unitary control device is provided for the chuck jaw operating mechanism and for the saddle operating mechanism and in its preferred form this means comprises a valve 91 mounted on the top of the cylinder 88 and having a rotatable valve member 92 therein operable by a handle 93.

As shown in detail in Fig. 6, a flexible fluid supply line 95 and an exhaust line 96 are connected to valve ports 97 and 98 respectively formed in the valve casing at diametrically opposite points. The fluid lines 74 and 85 which lead to the cylinders 61 and 60 are connected to ports 100 and 101 formed in the valve casing at diametrically opposite points and spaced 90° from the ports 97 and 98. The valve member 92 has a pair of passages 103 and 104 formed therein, the two ends of each passage opening at points spaced at 90° while the ends of the passage 103 are spaced at 90° from the ends of the passage 104. Thus when the valve member 92 is positioned as shown in Fig. 6 the passage 103 will connect the cylinders 61 with the fluid supply line 95 so that the chuck jaws 47 will be closed. While the valve is in this position, the cylinders 60 are connected through the passage 104 to the exhaust line 96.

When the valve member 92 is moved through 90° the connections to the cylinders will be reversed and the chuck jaws 47 moved to open position.

In the form shown, passages 106 and 107 connect the forward and rear sides respectively of the cylinder 88 with the valve 91. The passage 106 enters the valve casing at a point spaced from but axially alined with the port 101 while the passage 107 enters the valve casing at a similar point on the opposite side thereof. Ports 97ª and 98ª are formed in the valve casing extending axially of the casing from the ports 97 and 98 respectively and to connect these ports 97ª and 98ª with the passages 106 and 107, passages 103ª and 104ª are formed in the valve member 92.

The passages 103ª and 104ª are formed in the outer surface of the valve member 92 and each one extends in a counter-clockwise direction beyond its corresponding passage 103, 104 so that when the valve member 92 is thrown rapidly by the operator in a counterclockwise direction from the position illustrated in Fig. 6 the connections to the cylinder 88 will first be reversed and the saddle 18 withdrawn. During the last part of the movement of the valve member, the connections to the chuck jaw operating devices will be reversed and the jaws unclamped.

When the valve member 92 is thrown in the opposite or clockwise direction, however, this sequence of operation is reversed and the passages 103ª and 104ª will maintain the same connections until after the passages 103 and 104 have reversed the connections to the jaw operating devices and the jaws 47 have been clamped. The last part of the movement of the valve member 92 in a clockwise direction reverses the connections to the cylinder 88 and causes the saddle 18 to be moved to its operative position adjacent the cutter.

By this arrangement of the valve connections the proper sequence of the various operations is maintained and the operator is able by a single simple movement of the control handle 93 to cause a workpiece first to be clamped on the work holder and then advanced to an operative position adjacent the cutter. By a reverse movement of the control handle 93 the work is moved rapidly from the cutter and the jaws substantially unclamped so that the workpiece may be removed and replaced.

Since the valve 91 is located so close to the cylinder 88, the passages 106 and 107 are preferably formed by means of bores formed in the valve and cylinder castings, these bores being shown diagrammatically in Fig. 6. Thus by the valve arrangement herein shown, a workpiece may be clamped on the work holder and movement of the work holder toward the cutter initiated practically simultaneously.

When the work is advanced toward the cutter 15, it is fed to a predetermined depth so that the cutter will remove material to the desired distance from the rotational axis of the work holder 19, and to provide an accurately adjustable means for limiting such feeding-in movement, a micrometer stop device 109 (Fig. 1) is mounted on the saddle 18 to engage the sub-base 17 when the saddle has been moved in to the desired depth.

During the last portion of the feeding movement it will be apparent that the cutter will cut into the workpiece and in order to prevent excessive dulling or breaking of the cutter during this operation, means is provided for regulating the speed of the feeding-in movement of the work. This means in its preferred form comprises a valve device 110 shown diagrammatically in Fig. 6 operable to vary the flow of pressure fluid to the cylinder on the rear side of the piston 88 whereby to vary the rate at which the work holder 19 will be moved toward the cutter 15.

After a workpiece has been clamped in position on the work holder 19 and fed in to the cutter 15 so as to be cut to the desired depth thereby, the work holder 19 is rotated about its vertical axis so that the cutter will remove a peripheral cut of stock from the workpiece. In the form disclosed, power operated mechanical means is provided for rotating the work holder 19 and to this end a worm wheel 111 is keyed to the spindle 25 between the upper and lower bearings 28 and 35 and is engaged by a worm 112 fixed on a horizontal shaft 113 rotatably mounted within the saddle 18 substantially parallel to the ways 20. A helical gear 114 is loosely mounted on the shaft 113 and engages a similar helical gear 115 mounted beneath it on a shaft 116 which has a driving connection (not shown) with the prime mover or feed box of the machine.

It is contemplated that when the machine is in use the helical gear 114 is driven continuously and that it may be operatively connected to the shaft 113 when desired by means of a clutch member 117 splined on the shaft 113 and shiftable by a yoke 118 to engage with suitable clutch teeth formed on the gear 114. To operate the clutch 117, a handle 120 is preferably provided pivotally mounted on the forward side of the saddle 18 and having one end operatively engaging a slide rod 121 which extends into the saddle and is attached to the yoke 118.

After the workpiece has been rotated through a complete revolution while it is in operative relation with the cutter the cutting operation is complete and the work holder 19 may be retracted and a new workpiece placed thereon. In order to make the operation of the machine automatic after the feeding movement is initiated and to prevent operation of the cutter on parts of the workpiece already milled, automatic means is preferably provided to disengage the clutch 117 after each complete revolution of the work holder 19. This serves to save the operator's time and insures that the work holder 19 will always be in the same rotative position when retracted.

To this end, the yoke 118 (Fig. 1) has an arm 122 integrally formed therewith so that the yoke 118 and the arm 122 extend from the rod 121 in opposite directions. The free end of the arm 122 is connected to a rod 123 mounted in the saddle 18 substantially parallel to the slide rod 121 and in radial relation to the spindle 25.

Thus when the lever 120 is actuated to engage the clutch member 117, the rod 123 will be moved toward the axis of the spindle 25 and cam means is provided which will engage the rod 123 to disengage the clutch 117 after the work holder 19 has been moved through a complete revolution. In its preferred form this means is mounted on the spindle by means of a collar 125 (Fig. 1) which may be angularly adjusted and secured in adjusted position by a suitable set screw.

Preferably the cam means includes a movable cam member 126 pivoted on the collar 125 and normally urged to the position shown in Fig. 1 by an expansive spring 126ª mounted between the member 126 and the collar 125. The member 126 has a cam surface 127 formed thereon arranged during the normal rotation of the work holder (in a clockwise direction as indicated by the arrow in Fig. 1) due to engagement of the clutch 117, to engage the end of the slide rod 123 to disengage the clutch.

This movement is resisted by a pointed detent plunger 128 mounted in a vertical bore in the saddle 18 and pressed downwardly by a spring 129. The plunger 128 is arranged yieldingly to engage a grooved member 130 secured on the rod 123 thus to maintain the clutch 117 in engaging position and engages the end of the member 130 to maintain the clutch member 117 in its ineffective position. Due to the resistance of the detent plunger 128, the cam member 126 is pivoted so as to compress the spring 126ª and after a predetermined movement the member encounters an abutment 127ª which stops the pivotal movement of the member 126. Thereafter the cam member positively moves the rod 123 and as soon as the detent 128 is moved out of the groove the spring 126ª will, through pivoting the cam member 126 back to its normal position, positively insure disengagement of the clutch. Due to the pivotal movement of the member 126 by the spring 126ª, the member 126 is moved out of the path of the rod 123 so as to permit inward movement thereof when the operator again wishes to engage the clutch.

In the operation of the machine, the valve member 92 is first turned by means of its handle 93 to a position 90° in a counter-clockwise direction from that shown in Fig. 6, in which position the jaws 47 are unclamped and the saddle 18 is retracted to its inoperative or loading position remote from the cutter 15 so that a workpiece may readily be placed between the jaws 47 by the operator.

After a workpiece has been placed in position, the valve member 92 is thrown rapidly in a clockwise direction by means of the handle 93. During this movement the passages 74 and 85 are first disconnected from the exhaust line 96 and the supply line 95 respectively and their connections reversed while the passage 106 is still connected to the supply line 95 by the passage 104ª and the port 97ª. The saddle 18 is therefore retained in its retracted or inoperative position while the workpiece is clamped in the jaws 47 by the action of the cylinders 61 and their pistons 62 which are connected to the supply line 95 by the passage 103. Since the jaws 47 are moved in timed relation to each other, the workpiece will be accurately clamped in the desired relation to the rotative axis of the work holder 19.

The last portion of the movement of the control handle 93 in a clockwise direction will reverse the connections to the cylinder 88 and the passage 107 will be connected by the passage 103ª and port 97ª to the supply line 95 while the passage 106 will be connected to the exhaust line 96 by the passage 104ª and the port 98ª. This will cause the saddle 18 carrying the work holder 19 to be fed in toward the rotating cutter 15. During this movement the cutter 15 will cut to the desired depth in the workpiece as determined by the micrometer stop device 109 and the speed of movement of the workpiece will be regulated by the setting of the valve device 110 in the passage 107.

The control handle 120 on the forward side of the saddle 18 may then be moved to engage the clutch member 117 with the constantly rotating helical gear 114 to rotate the shaft 113, and, through the medium of the worm 112 and worm 113, cause rotative or feeding movement of the work holder 19. When the clutch 117 is engaged the bar 123 which is rigidly associated with the clutch operating member 118 is moved radially toward the axis of spindle 25 and is held in place by the spring detent 128.

When the work has been rotated through nearly a complete revolution, the bar 123 is engaged by the cam surface 127 on the member 126. After the rod 123 first engages the cam surface 127, the member 126 will be pivoted so as to compress the spring 126ª and store up power therein and after the member 126 has been pivoted sufficiently to strike the abutment 127ª, the rod 123 will be moved positively against the action of the detent 128 to disengage the clutch member 117. After the rod 123 has been moved sufficiently to render the detent 128 ineffective the spring 126ª will expand and move the member 126 so as to give the rod 123 an added urge outwardly and position the member 126 out of the path of the rod 123 so that the rod 123 may be moved freely inwardly when it is desired to again engage the clutch member 117.

The milling operation is then completed and to move the work holder to its inoperative position and unclamp the workpiece the valve member 92 is moved rapidly in a counter-clockwise direction (from the position shown in Fig. 6) to its other position. During this movement the connections to the cylinder 88 are first reversed so that the saddle 18 is retracted and then the connections to the chuck jaw operating devices are reversed and the jaws 47 are moved to their open position by the cylinders 60 and their pistons 62. The workpiece may then be removed and replaced and the operation repeated.

From the foregoing it will be apparent that the invention provides a milling machine which is of marked advantage for the high speed production of accurately milled duplicate workpieces since the machine is rapidly and accurately operable without undue physical effort on the part of the operator.

Furthermore, the invention provides for automatically stopping the feeding movement of the work holder upon the completion of the cutting operation and it will be apparent that this will serve to decrease the time lost and hence increase the production.

It will also be apparent that the exemplary form of power means used to feed the workpiece in to the cutter is of particular advantage since it lends itself to the provision of simple, positive and accurately adjustable means for limiting this feeding movement whereby to simplify the production of accurately dimensioned workpieces.

It will be apparent that since the control handle 93 may be rapidly thrown from one position to the other to cause the various movements of the parts in proper sequence and practically simultaneously, the time required for completion of an operation is materially reduced and the operator's time is conserved.

I claim as my invention:

1. The combination with a milling machine having a base, a knee projecting forwardly from the base, and a milling cutter rotatably supported over said knee, of a saddle slidable on said knee between an inoperative loading position remote from said cutter and an operative position adjacent said cutter, a work holder movably mounted on said saddle, means on said saddle arranged to impart a feeding movement to said work holder relatively to said saddle and said cutter, means on said work holder for clamping a work piece thereon, and power means on said work holder for operating said clamping means.

2. In a milling machine having a base and a rotatable cutter, the combination of a saddle mounted on said base for movement between an inoperative loading position remote from said cutter and an operative position adjacent the cutter, a work holder rotatably mounted on said saddle, means driven from the prime mover of the machine operable when said saddle is in its operative position to effect a feeding movement of the work holder relatively to the saddle, and means for moving said saddle from said inoperative position to said operative position and for holding said saddle in said operative position during said feeding movement comprising a piston and cylinder device one element of which is connected to said saddle and the other to said base, and a valve having two positions in one of which it is arranged to admit pressure fluid to one end of the cylinder to move the piston to one end of its stroke and to hold the saddle in its operative position, said valve in the other position being arranged to admit pressure fluid to the other end of said cylinder to move the piston to the other end of its stroke and to hold said saddle in its inoperative position.

3. In a milling machine having a base and a vertical milling cutter supported by said base, the combination of a saddle mounted on said base for movement toward and from said cutter, a work holder rotatably mounted on said saddle to permit removal of a peripheral cut of stock from a work piece carried by said holder, adjustable stop means for limiting the movement to determine the depth of cut, and pressure fluid operated means for moving said saddle toward and from the cutter comprising a piston and cylinder device having one element connected to said base and the other to said saddle, and means for controlling the admission and exhaust of pressure fluid to and from the opposite ends of said cylinder, said control means being arranged to admit pressure fluid to move said saddle toward the cutter and to hold the saddle against said stop means during such peripheral cut.

4. In a milling machine for removing a peripheral cut of stock from a work piece, the combination of a rotatable work holder, driving means, a clutch for connecting said driving means with said work holder to rotate the holder, and means automatically operable to disconnect said clutch to stop the rotation of said work holder upon the completion of one revolution, said automatic means including a cam follower connected to said clutch, a cam connected to said work holder for movement therewith and arranged to engage said follower when said clutch is engaged, said cam being mounted for limited movement relatively to the work holder by engagement with the follower, and resilient means resisting such movement whereby to store up power during movement of the work holder to cause further relative movement of the cam and cam follower after movement of the work holder has stopped.

5. In a milling machine having a bed and a rotatably supported cutter, the combination of a work holder, a saddle rotatably supporting said work holder and slidable on said bed, means for imparting a feeding movement to said work holder relatively to said saddle, clamping jaws on said work holder for securing a work piece thereon, a piston and cylinder for clamping said jaws, a piston and cylinder for moving said saddle from an inoperative loading position remote from the cutter to an operative position adjacent the cutter, and a common control valve for said two cylinders arranged to cause the jaws to clamp before causing movement of the saddle from its inoperative to its operative position.

6. The combination with the base of a milling machine, of a saddle slidably supported on said base, a work holder rotatably mounted on said saddle, work clamping means on said saddle, means for rotating said work holder, means for moving said saddle, and control devices for all of said means mounted on the forward side of said saddle for movement therewith.

7. The combination with a milling machine having a bed and actuating means within the bed adjacent to the top thereof and normally used for feeding a work table, of a saddle, a base for slidably supporting said saddle, said base being supported on the bed, a work holder rotatably mounted on the saddle, and mechanical means for rotating said work holder, said means being carried by said base and said saddle and being adapted to be connected to and actuated by said table feeding means.

8. The combination of a saddle, a spindle rotatably mounted therein, a work holder mounted on one end of said spindle for rotation therewith, pressure fluid operated work clamping means on said work holder, a duct formed in and extending longitudinally of said spindle and connected at one end to said pressure fluid operated means, pressure fluid supply means connected to the other end of said duct so as to permit rotation of said spindle, and mechanically operated means on said saddle to rotate said spindle and work holder thereon.

9. An attachment of the character described for use with a milling machine having a bed, a column at one side of said bed, a milling cutter supported by said column over said bed, and driving means in said bed near the top thereof normally used for actuating a table, said attachment comprising a base adapted to be secured on said bed in front of said column, a saddle mounted on said base for sliding movement toward and away from said column, a rotatable work holder mounted on said saddle, means for operatively connecting said work holder to said driving means for rotation thereby, and a piston and cylinder device for moving said saddle toward and away from said column, one part of said device being connected to said base and the other part being connected to said saddle.

10. An attachment of the character described for use with a milling machine having a column, a knee projecting forwardly therefrom, a milling cutter supported by said column over said knee, and driving mechanism in said knee normally used for actuating a table carried by said knee along a path extending transversely of the machine in front of the column, said attachment comprising a base adapted to be secured on said knee, a saddle mounted on said base for sliding movement transversely of the path traversed by the usual table, a work holder rotatably mounted on said saddle, means for rotating said holder relatively to said saddle at feeding speed, and means for moving said saddle back and forth between an operative position adjacent the cutter and an inoperative loading position adjacent the front side of said knee.

In testimony whereof, I have hereunto affixed my signature.

PAUL S. JACKSON.